United States Patent [19]

Fujimura et al.

[11] Patent Number: 5,968,810
[45] Date of Patent: Oct. 19, 1999

[54] STRESS-RELIEVING FEED

[75] Inventors: Motoki Fujimura, Kyoto; Syuhei Ishihara, Osaka; Kunie Nishijima; Katsuyuki Kataoka, both of Saiki, all of Japan

[73] Assignee: Kohjin Co., Ltd., Tokyo, Japan

[21] Appl. No.: 08/823,201

[22] Filed: Mar. 24, 1997

[30] Foreign Application Priority Data

Mar. 28, 1996 [JP] Japan ................................ 8-073859

[51] Int. Cl.$^6$ .............................. A23K 1/10; A01N 63/00
[52] U.S. Cl. .................................. 435/255.1; 435/255.4; 424/93.51; 426/62
[58] Field of Search ............................. 435/255.1, 255.4; 424/93.51; 426/62

[56] References Cited

U.S. PATENT DOCUMENTS

| | | |
|---|---|---|
| 4,005,225 | 1/1977 | Craig et al. . |
| 4,055,666 | 10/1977 | Jeffreys et al. . |
| 4,055,667 | 10/1977 | Linton et al. . |
| 5,032,410 | 7/1991 | Furukawa et al. . |

FOREIGN PATENT DOCUMENTS

WO 96/22019    7/1996    WIPO .

OTHER PUBLICATIONS

Proc. Jpn. Anim. Biochem., 20, 59–67 1987. Manual of Animal Model for Development of New Drugs, p. 249, R&D Planning, published in 1985.

*Primary Examiner*—Leon B. Lankford, Jr.
*Attorney, Agent, or Firm*—Oliff & Berridge, PLC

[57] ABSTRACT

A feed and a method for relieving stress of livestock and poultry are provided. The feed for relieving stress containing yeast rich in glutathione or a mixture of glutathione and yeast is prepared and is fed to livestock and poultry to relieve their stress.

8 Claims, No Drawings

STRESS-RELIEVING FEED

BACKGROUND OF THE INVENTION

1. Field of the Invention

The present invention relates to a feed for relieving stress and a method of relieving stress. More specifically, it relates to a stress-relieving feed for livestock or poultry which comprises yeast rich in glutathione or a mixture of glutathione and yeast, and a method of relieving stress which comprises feeding to livestock or poultry yeast rich in glutathione or a mixture of glutathione and yeast.

2. Description of the Related Art

The present days are called the age of stress. Stress is a serious problem for not only humans but also animals.

Stress of livestock such as cattle, hogs, fowls, and horses is caused by the environment of their stalls including the physical environment such as temperature and humidity, and the biological environment such as pathogenic microbes and relationship between animals, which results in an inhibition of generative function, a decline of productivity, an increase in the occurrence of diseases, and a formation of stomach ulcer. Upon transportation, animals suffer from extreme stress attributed to fatigue caused by jolting on the truck, excitement resulted from encountering with other cattle, hogs and the like, a sudden change of an external environment such as coldness and heat. As a result, such stress may cause them infectious diseases, among which pneumonia is a main disease, and diarrhea. There is a report that, when cattle are transported by truck, it leads to changes in cell-mediated immunity including a rise of a plasma cortisol level, an increase of the number of white blood cells, and a selective decline of T-lymphocytes (Proc. Jpn. Anim. Biochem., 20, 59 . 67 1987).

In the case of livestock for meat, quality of meat is sometimes deteriorated from stress which is caused by cutting off of supply of feeds and water after brought into a slaughterhouse, confinement under overcrowded conditions, and chasing by force immediately before slaughter, in addition to transportation before slaughter.

Recently, people who are feeding pets in their apartments are increasing. Since a sphere of action of such pets is limited to small rooms, they cannot freely go outside and cannot communicate with other individuals. Thus, they suffer from stress, which makes them run about the rooms. Dogs often howl, while cats often sharpen their claws upon a post or furniture. Such abnormal behaviors attributed to stress caused by environment are observed among animals in the zoo. For example, tongue playing is known. It is often seen that giraffes in the zoo put out and pull in their slender tongues at a momentary speed. This behavior is not seen for giraffes which live wild lives in a vast grassy plain. Accordingly, it is said that the cause of the behavior is stress resulted from that they are confined in a small cage and are deprived of their free lives.

In order to prevent such problems caused by stress, for example, to prevent deterioration of quality of pork, some meat centers give such guidance in a system to slaughter hogs as to change the conventional strainer with V-shape guide way to the mobile floor conveyer system, and to adjust the period from the last feeding to slaughter to within 30 hours, in a transportation system as to change the materials of the floor of trucks to non-slippery ones, to make compartments, and to make a plan for an animal-collecting schedule which makes the transportation period shorter.

Though there are considered many stressors for stress derived from the feeding management of livestock, any reform measure has not been taken. This is because most of stressors relate to the feeding facilities such as materials of the floor and spatial extent of stockades, and therefore it costs a great deal to effect reformation. Concerning the transportation system for livestock, its improvement requires reformation of trucks, and it takes great expense in one lot. Further, in the case of livestock for meat, the collection areas are expanding in keeping with facilities and magnification of the slaughterhouse, which necessarily makes the transportation period longer. Though some meat centers give guidance as described above, it is difficult for them to guide all of farms thoroughly because the areas are expanding. Thus, they can guide very few farms through the country.

SUMMARY OF THE INVENTION

As a result of intensive investigation to solve the above problems, the present inventors found that stress can be relieved by feeding to livestock dry yeast belonging to the genus Torulaspora (hereinafter referred to as Torulaspora yeast) which is rich in glutathione, and occurrence of stomach ulcer can be suppressed. Thus, the present invention has been completed.

The present invention provides a stress-relieving feed for livestock or poultry which comprises yeast rich in glutathione or a mixture of glutathione and yeast, and a method of relieving stress which comprises feeding to livestock or poultry yeast rich in glutathione or a mixture of glutathione and yeast.

PREFERRED EMBODIMENT OF THE INVENTION

The term "yeast rich in glutathione" used herein means yeast containing in its cell about 5 to about 100 times as high amount of glutathione as that contained in the cell of normal glutathione-producing yeast, and the yeast contains about 0.3 to about 10 wt %, preferably about 0.5 to about 7 wt %, of glutathione based on the weight of dry cells. Examples of the yeast rich in glutathione include Torulaspora yeasts, baker's yeasts, brewer's yeasts and the like, with being Torulaspora yeasts particularly preferred.

In the present invention, a mixture of yeast and purified or crudely purified glutathione can be used in place of the yeast rich in glutathione.

Examples of such yeast include Torulaspora yeasts, baker's yeasts, brewer's yeasts and the like, with being Torulaspora yeasts particularly preferred.

When a mixture of yeast and purified or crudely purified glutathione is used, it is preferable to mix yeast and purified or crudely purified glutathione corresponding to a ratio of cells to an amount of glutathione in the yeast rich in glutathione.

The term "glutathione" used herein means reduced glutathione, oxidized glutathione or a mixture thereof.

Examples of livestock and poultry to be subjected to the invention include not only typical livestock and poultry such as cattle, hogs, fowls, horses, sheep, donkeys, mules, boars, inobuta, rabbits, quails, ducks, bantams, gamecocks, pigeons, turkeys, but also various animals such as mammals other than humans, birds, reptiles, batrachians, which suffer from stress and can be fed in the house or in the zoo, for example, companion animals such as dogs, cats, monkeys, hamsters, mice, rats, hill minas, parrots, parakeets, and canaries, and animals fed in the zoo such as giraffes, elephants, hippopotamuses, lions, dolphins, orcas, and the like.

The feed for relieving stress of the present invention contains yeast rich in glutathione. The feed to be used is not particularly limited as long as it can be given to livestock and poultry. Commercially available feed can be used as it is. The feed may contain various additives, depending on species and conditions of animals, including various vitamins such as vitamin A, B1, B2, B6, C, D2, D3 or E, minerals such as iron or magnesium, amino acids such as glycine, alanine, valine, methionine or threonin, lipid or fats and oils such as beta-carotene or fatty acid calcium, or drugs such as antibiotics.

The amount of yeast rich in glutathione to be mixed may be selected arbitrarily. For example, when dry Torulaspora yeast containing 3% of reduced glutathione is used, it is desirable to mix it in a daily amount of about 0.05 to about 4.0 g per kg of the body weight of an animal to be subjected.

As the yeast rich in glutathione, either of living cells or dried cells or dried and ground cells can be used as long as it can be simply added to normal mixed feeds.

The method of relieving stress of the present invention can be effected by a method comprising sprinkling directly yeast rich in glutathione on the feed or suspending it in the other feed, water or oil and then sprinkling directly on the feed, a method comprising suspending it in water or an oil and orally giving it by force, and a method comprising giving it in the form of pellets or crumbles.

Any method can be used for production of pellets, for example, a method comprising using a disk pelleter or an extruder. The daily amount to be given ranges, for example, from about 0.05 to about 4.0 g per kg of the body weight of an animal to be subjected when dry Torulaspora yeast containing 3% of reduced glutathione is used.

EXAMPLES

The present invention is explained in more detail with reference to Examples, but it is not construed to be limited to these Examples.

In the following Experimental Examples and Example, Cortisol Eiken (cortisol measuring kit: manufactured by Eiken Chemical Co., Ltd.) and Aroka 50-well gamma system ARC950 were used for quantification of corticosterone.

Experimental Example 1

Rats were divided into a dry Torulaspora yeast rich in glutathione feeding group and a non-feeding group so as to have 20 heads per group. The dry Torulaspora yeast rich in glutathione (glutathione content: 3%) was suspended in water and orally fed to rats by force in an amount of 0.67 g (20 mg of glutathione) per Kg of the body weight of a rat daily for 10 days using a probe. The non-feeding group were orally given tap water by force for 10 days. During the test period, rats were allowed to take feeds (commercially available solid feeds for rats) and water at will. The rats, which were fasted for about 20 hours after the last feeding, were loaded with stress for 7 hours by the water-immersing restraint ulceration method ("Manual of Animal Model for Development of New Drugs", page 249, R & D Planning, published in 1985). Immediately or 6 hours thereafter, blood was collected from five rats in each group, and a concentration of corticosterone in serum was measured.

The results are shown in Table 1.

TABLE 1

|  |  | Non-feeding group | Torulaspora yeast rich in glutathione feeding group |
|---|---|---|---|
| Blood corticosterone concentration ($\mu$ g/dl) | Immediately after stress loading | 9.78 | 8.50 |
|  | After 6 hours | 12.46 | 9.28 |

From the results shown in Table 1, in the non-feeding group the corticosterone concentration in serum, which had increased after stress loading, was not decreased after 6 hours of stress loading, while, in the dry Torulaspora yeast rich in glutathione feeding group, the corticosterone concentration after 6 hours of stress loading was decreased to the same level as that immediately after stress loading. Thus, it was confirmed that stress tends to be relieved in the latter group.

Experimental Example 2

Using five rats in each of the dry Torulaspora yeast rich in glutathione feeding group and the non-feeding group which were loaded with stress by the water-immersing restraint ulceration method in Experimental Example 1, the length (mm) of lesion generated on the mucous membrane of the stomach was measured to calculate the average of the sum per rat as ulcer coefficient (U.I mm).

The results are shown in Table 2.

TABLE 2

|  | Non-feeding group | Torulaspora yeast rich in glutathione feeding group |
|---|---|---|
| Ulcer coefficient (U.I mm) | 16.6 | 8.0 |
| Inhibition rate (%) | — | 51.8 |

*The inhibition rate was determined based on the value obtained in the non-feeding group.

From the results shown in Table 2, it was found that stomach ulcer was more inhibited in the dry Torulaspora yeast rich in glutathione feeding group than in the non-feeding group.

Example 1

Table 3 shows an example of a dry food for dogs.

TABLE 3

| Ingredients | Mixing ratio (%) |
|---|---|
| dry Torulaspora yeast rich in glutathione | 4 |
| corn | 9 |
| flour | 14 |
| oats | 12 |
| meat bone meal | 15 |
| skim milk | 3 |
| soybean oil cake | 15 |
| fish meal | 11 |
| bran | 5 |
| wheat germ | 3 |
| plant oil | 3 |
| vitamin/mineral mixture | 6 |

As described above, the stress-relieving feed and the method of relieving stress according to the present invention have an effect for relieving stress of livestock and poultry by such a very inexpensive and simple method as to just give livestock and poultry, as compared with the conventional techniques as reformation of facilities, thorough precautions concerning transportation and the like.

What is claimed is:

1. A feed for relieving stress of livestock and poultry which comprises yeast containing at least about 0.5 wt. % glutathione or a mixture of glutathione and yeast in which at least about 0.5 wt. % of the mixture is glutathione.

2. The feed for relieving stress of livestock and poultry as claimed in claim 1, wherein said yeast containing at least about 0.5 wt. % glutathione or said yeast in said mixture is selected from the group consisting of Torulaspora yeasts, baker's yeasts and brewer's yeasts.

3. The feed for relieving stress of livestock and poultry as claimed in claim 1, wherein said yeast containing at least about 0.5 wt. % glutathione or said yeast in said mixture is Torulaspora yeasts.

4. A method of relieving stress of livestock and poultry which comprises feeding to livestock and poultry yeast containing at least about 0.5 wt. % glutathione or a mixture of glutathione and yeast in which at least about 0.5 wt. % of the mixture is glutathione.

5. The method of relieving stress of livestock and poultry of claim 4, wherein said yeast contains between about 0.5 wt. % and about 7 wt. % glutathione or in which between about 0.5 wt. % and about 7 wt. % the mixture is glutathione.

6. The method of relieving stress of livestock and poultry of claim 4, wherein said yeast containing at least about 0.5 wt. % glutathione or said yeast in said mixture is selected from the group consisting of Torulaspora yeasts, baker's yeasts and brewer's yeasts.

7. The method of relieving stress of livestock and poultry of claim 4, wherein said yeast containing at least about 0.5 wt. % glutathione or said yeast in said mixture is Torulaspora yeasts.

8. The method of relieving stress of livestock and poultry of claim 4, wherein the formation of stomach ulcers in the livestock and poultry is suppressed.

* * * * *